(12) United States Patent
Raghu et al.

(10) Patent No.: US 10,032,085 B2
(45) Date of Patent: Jul. 24, 2018

(54) METHOD AND SYSTEM TO IDENTIFY TRAFFIC LIGHTS BY AN AUTONOMOUS VEHICLE

(71) Applicants: VOLKSWAGEN AG, Wolfsburg (DE); AUDI AG, Ingolstadt (DE)

(72) Inventors: Kaushik Raghu, Redwood City, CA (US); Subramanian Swaminathan, Belmont, CA (US); Najib Hadir, Woodside, CA (US)

(73) Assignees: Audi AG (DE); Volkswagen AG (DE)

( * ) Notice: Subject to any disclaimer, the term of this patent is extended or adjusted under 35 U.S.C. 154(b) by 311 days.

(21) Appl. No.: 15/052,363

(22) Filed: Feb. 24, 2016

(65) Prior Publication Data

US 2017/0243073 A1 Aug. 24, 2017

(51) Int. Cl.
*G06K 9/00* (2006.01)

(52) U.S. Cl.
CPC .................. *G06K 9/00818* (2013.01)

(58) Field of Classification Search
CPC ............ G01C 21/3461; G01C 21/3484; G08G 1/0112; G08G 1/096811; G08G 1/096838; G08G 1/096888; G08G 1/164; G01S 19/17; G01S 19/34; G01S 19/52; G06K 9/00818; H04L 12/6418; H04W 52/0241; Y02D 70/00; Y02D 70/164
See application file for complete search history.

(56) References Cited

U.S. PATENT DOCUMENTS

| | | | | |
|---|---|---|---|---|
| 8,675,909 | B2 * | 3/2014 | Sivertsen | G08G 1/07 340/905 |
| 2011/0032119 | A1 | 2/2011 | Pfeiffer et al. | |
| 2011/0098916 | A1 * | 4/2011 | Jang | G01C 21/3697 701/533 |
| 2011/0187547 | A1 * | 8/2011 | Kweon | B60K 35/00 340/670 |
| 2012/0010797 | A1 * | 1/2012 | Luo | F02N 11/0837 701/70 |
| 2012/0166083 | A1 * | 6/2012 | Okabe | G01C 21/3602 701/518 |
| 2013/0110316 | A1 * | 5/2013 | Ogawa | G08G 1/096716 701/1 |
| 2015/0039212 | A1 * | 2/2015 | Kido | G08G 1/09623 701/117 |
| 2015/0210276 | A1 * | 7/2015 | Ben Shalom | B60W 30/00 382/104 |
| 2015/0210312 | A1 | 7/2015 | Stein et al. | |
| 2015/0294167 | A1 * | 10/2015 | Zhang | G06K 9/00825 382/103 |
| 2015/0332104 | A1 * | 11/2015 | Kapach | G06K 9/6215 382/104 |
| 2016/0306361 | A1 * | 10/2016 | Ben Shalom | B60W 30/00 |

FOREIGN PATENT DOCUMENTS

| | | |
|---|---|---|
| DE | 102009049408 A1 | 4/2010 |
| DE | 102012111740 A1 | 6/2014 |
| DE | 102014219742 A1 | 4/2015 |

OTHER PUBLICATIONS

USDoT; Yellow-Light Timing; 2010.*

* cited by examiner

*Primary Examiner* — Peter D Le
(74) *Attorney, Agent, or Firm* — Barnes & Thornburg LLP

(57) ABSTRACT

A method and system to determine whether a traffic light applies to a vehicle. Traffic light count, visibility duration and spatial position are analyzed to determine the applicability of a traffic light to a vehicle.

33 Claims, 8 Drawing Sheets

METHOD AND SYSTEM TO IDENTIFY TRAFFIC LIGHTS BY AN AUTONOMOUS VEHICLE

BACKGROUND OF THE INVENTION

Autonomous vehicles use control systems that must recognize traffic signs and traffic lights in the area surrounding the vehicle and must be able to determine whether they apply to the vehicle. Even a vehicle travelling on a freeway may encounter traffic lights that it must observe. These must be distinguished from traffic lights that do not apply to the vehicle, such as those on overpasses, side roads, exit ramps and entrance ramps. Traffic lights that do not apply to a vehicle must be rejected by the control system since false positives can be as dangerous as a failure to identify a traffic light that a vehicle must respect.

Therefore, there is a need to have an intelligent traffic light selection algorithm in autonomous vehicle control systems that can differentiate between traffic lights that apply to the vehicle and those that do not.

SUMMARY OF THE INVENTION

A method and system, according to an illustrative embodiment of the invention, distinguishes between traffic lights that a vehicle must observe and those that are not applicable to the vehicle. Information about the area surrounding a vehicle, for example in the form of images, is captured and analyzed to determine whether traffic lights identified in the images are applicable to the vehicle. Although embodiments of the invention may be of particular benefit to an autonomous vehicle, a piloted vehicle may benefit by providing a warning system that will signal a driver to obey a traffic light.

Algorithms are provided that first count the number of traffic lights identified in the image, and if the number is less than a threshold, the system concludes the traffic light is not applicable to the vehicle so no response action is generated. If the number meets the threshold count, the traffic light is considered to possibly be applicable to the vehicle and further analysis is performed.

Next the duration the traffic light is visible to the image capture device or other traffic light information-providing device is determined and compared to a threshold time. If the duration meets the threshold time, there is a significant probability that the traffic light applies to the vehicle so further analysis is performed to rule out false positives, and if it is less than the threshold time, the traffic light is deemed not to apply to the vehicle.

Next, the spatial position of the traffic lights is evaluated by first determining whether there is at least one traffic light to the left of the vehicle and one traffic light to the right of the vehicle. If the threshold number of traffic lights to the left and right of the vehicle is met, the system generates a signal to control the vehicle appropriately, for example, by stopping the vehicle if the traffic light is red, or warns the driver to take action with regard to the traffic light. Before generating the signal, other traffic light positioning details can be considered.

The number of traffic lanes or other road configuration variations can be addressed by analyzing images differently that contain information associated with those road variations. Relevant information that may be associated with road variations can include, for example, an increased number of traffic lights in an image and particular positional distributions of traffic lights with respect to the vehicle.

DESCRIPTION OF THE DRAWINGS

The detailed description of illustrative embodiments of the invention refers to the accompanying figures in which.

DETAILED DESCRIPTION OF THE INVENTION

The figures and description provided herein include the necessary information for one skilled in the art to carry out embodiments of the invention, including the disclosed methods, systems and non-transitory computer readable media. Those skilled in the art may recognize that other components and steps may be desirable or necessary to implement embodiments of the invention in its various forms. As such, steps and components that are deemed known by one skilled in the art are inherently included in this disclosure.

According to an illustrative embodiment of the invention, a method and system distinguish between traffic lights that a vehicle must observe and those that are not applicable to the vehicle. As described herein, when a traffic light is deemed "applicable" it means there is a high enough probability that the traffic light should be obeyed. The system then may either alert the driver and possibly switch the vehicle to piloted mode, or cause the vehicle to directly respond to the input in an appropriate manner under an autonomous mode.

In an exemplary embodiment, the method and system are applied to a freeway environment or extended stretches of roadway on which a limited number of traffic lights apply to a vehicle.

Figure 1:
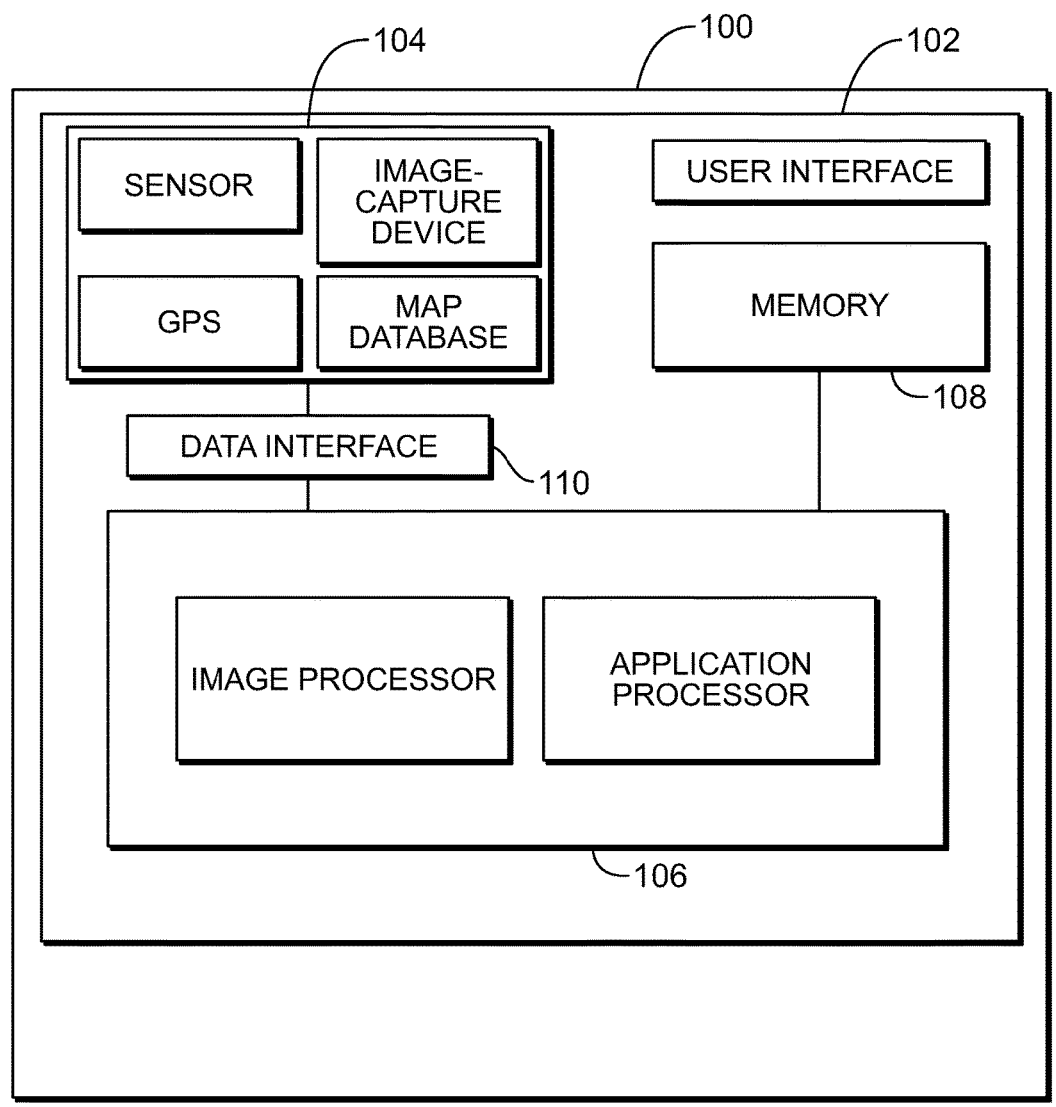
FIG. 1 is a block diagram representing a vehicle having a control system, such as could be used in an autonomous vehicle, according to an illustrative embodiment of the invention. The control system includes various information-providing devices, such as sensors, image capture devices, GPS devices and map databases, that can provide information used in an analysis of whether a traffic light in the vicinity of a vehicle applies to that vehicle. Algorithms used to evaluate the traffic lights are stored as computer code in a memory device. These program instructions when executed by processors evaluate traffic lights present to determine whether they apply to the vehicle.

FIG. 1 is a block diagram representing a vehicle 100 having a control system 102, such as would be used in an autonomous vehicle. The vehicle may be configured to operate in a fully autonomous mode, a fully driver-controlled mode or a combination of the two modes. Various components of control system 102 will be described that may be present as individual devices, or combined with one another in any possible combinations. Additionally, the components may be present as single or multiple components, such as a single memory device or multiple memory devices, but may be referred to in the singular.

Information-providing devices such as sensors, image capture devices or global positioning system (GPS) devices 104 obtain information about the area surrounding the vehicle, such as the location of the vehicle and position of objects with respect to the vehicle, including information regarding traffic lights that may apply to the vehicle. These will be referred to as "traffic light information devices" or "TL info devices." A map database and user interface may also be incorporated into control system 102. Data from TL info devices 104 are input as signals to one or more processors 106. A computer readable medium or other memory device 108, such as non-transitory storage devices, store program instructions to be executed by one or more processors 106. The program instructions include one or more executable algorithms to identify traffic lights in the vicinity of the vehicle and determine whether they apply to the vehicle.

Memory devices 108 may be integrated with processors 106 or be separate devices. Memory device 108 may be for example, types of random access memory, types of read only memory, flash memory and various other memory components suitable for use in the system.

Processors 106 may be any device(s) configured to execute one or more applications and analyze and process images and other inputted data from TL info devices 104. Processors 106 may include for example, central processing units and other types of integrated circuits, and may be configured as application or image processors, for example. Processors 106 may be functionally connected by a data interface 110 to sensors, image capture devices, displays, user interfaces or other control system components.

Connections between components of control system 102 may be hard-wired or wireless, including connections between the infrastructure and vehicle. Wireless communications can be achieved, for example, via radio or infrared signals. Short range wireless communication devices and mechanisms, such as low energy technologies, can be used for most components within the system. Wireless connections may be advantageous between TL info devices and processors containing the algorithms to analyze the information, such as images. For transmission associated with other system components, long range wireless technology may be beneficial.

Figure 2:
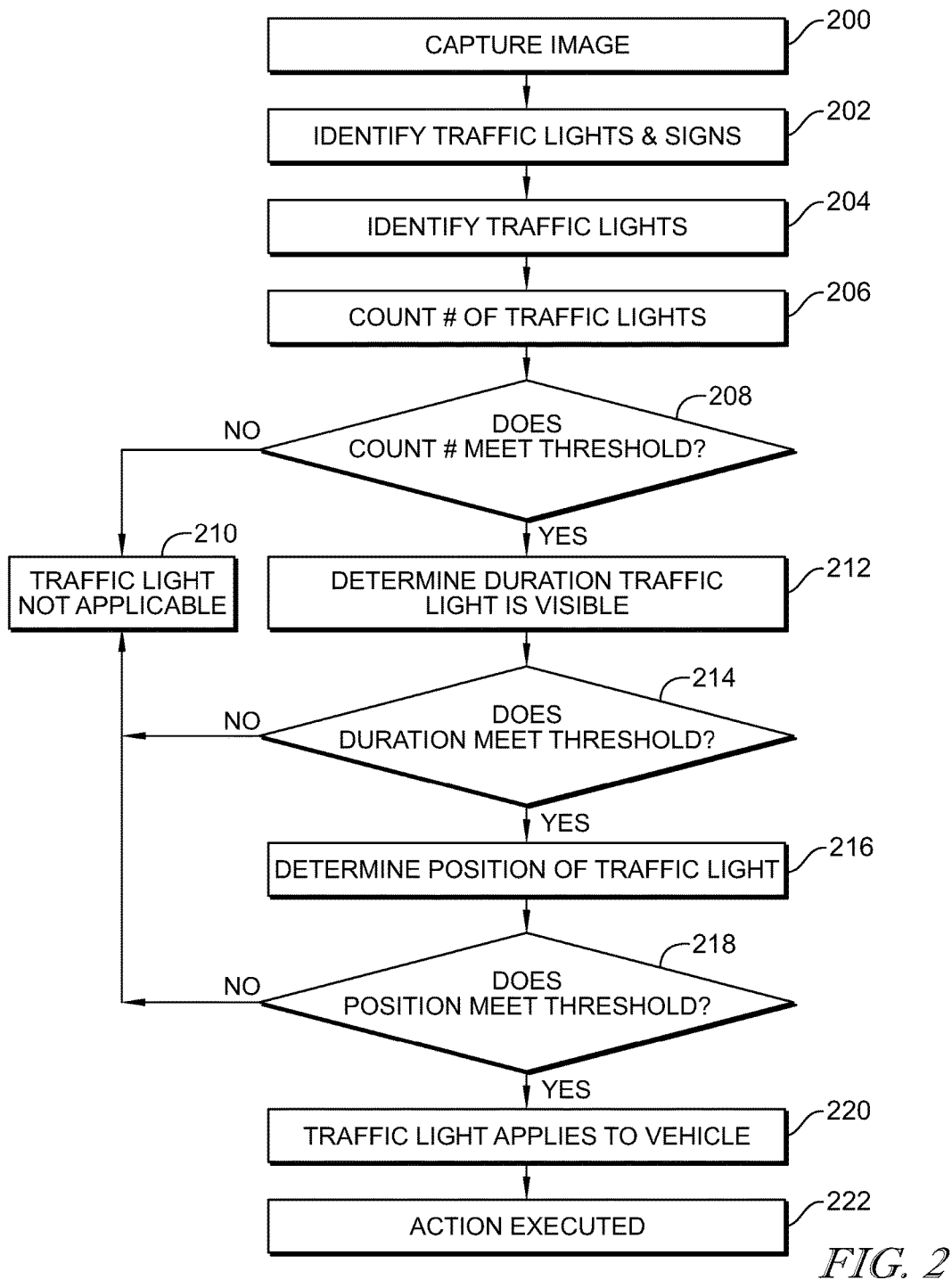
FIG. 2 is a flow chart outlining steps of a method for determining whether a traffic light applies to a vehicle, according to an illustrative embodiment of the invention. The steps include the measurement of at least three parameters including, the number of traffic lights in a frame, the duration a traffic light is visible to the image capture device, or other information-providing device, and the spatial location of the traffic light with respect to the vehicle.

FIG. 2 is a flow chart outlining steps of a method for determining whether a traffic light applies to a vehicle, according to an illustrative embodiment of the invention. In step 200 images are captured of the area surrounding the vehicle. Using object recognition software in step 202, images that possibly contain a traffic light or traffic sign are identified. In step 204 traffic lights are differentiated from traffic signs such as stop signs, for example by shape and content. If it is concluded that one or more objects are traffic lights that may potentially apply to the vehicle, then in step 206 each image frame is evaluated to determine the number of sets of traffic lights present in each frame. The phrase "set of traffic lights" or "traffic light set" as used herein refers to a group of lights in a single signal device, such as a group having a red, yellow and green light, and is used interchangeably with "traffic light."

The number of sets of traffic lights is compared to a threshold value in step 208. If the number of traffic light sets is less than the threshold value, it is concluded that the traffic lights do not apply to the vehicle, and the process is concluded for that image in step 210. If the number of traffic light sets is greater than or equal to the threshold value, then there is a significant probability that one or more of the traffic lights will apply to the vehicle so further analysis is conducted. In step 212, the duration of time that the traffic lights are continuously visible to the vehicle's camera or TL info device is determined. The duration begins when the number of traffic lights is over the threshold number and continues until the number falls below the threshold count. Thus, multiple consecutive frames are reviewed to determine which may contain applicable traffic lights, and thus, warrant further analysis. The determined duration is then compared to a selected threshold time span in step 214. If the amount of time is less than a selected threshold, the process ends at step 210 because the value indicates the traffic light does not apply to the vehicle. If the amount of time is greater than or equal to the selected threshold, then there is a higher enough probability that the traffic light applies to the vehicle, thus warranting additional consideration.

In step 216 the spatial position of the traffic lights relative to the vehicle is ascertained. In step 218 whether the traffic light position is within a certain range of positioning in three-dimensional space is determined. If the traffic light is outside of the range, the process ends at step 210 because the value indicates the traffic light does not apply to the vehicle. If the spatial position is within the selected range, it is concluded that there is a high enough probability it applies to the vehicle and the analysis proceeds to step 220. In an exemplary embodiment of the invention, the lateral position of the traffic light with respect to the vehicle and the height of the traffic light are more important than the longitudinal distance from the vehicle.

In step 222, an action is taken in response to the determination that a traffic light applies. This may be for example, alerting the driver so the driver can implement a response, or it can be a signal to, or within, the vehicle control system that causes the vehicle to react appropriately, such as by stopping.

In the description above, whether a traffic light applies to a vehicle is determined by a parameter being equal to or greater than a threshold. The algorithms though can be designed so that meeting a threshold means a variable equals the threshold. Similarly, meeting a maximum threshold can be coded as being "less than" a threshold or being "equal to or less than" a threshold. These substitutions can be made as appropriate or viable in any of the embodiments described herein.

Traffic lights are stationary, so ruling out moving or dynamic objects can be a factor assessed by the appropriate algorithms. Road curvature is another factor that can affect recognition of an object as a traffic light, and determination of whether it applies to the vehicle. This too can be incorporated as appropriate into the algorithms. In particular, this can be a factor in whether the duration is indicative of an applicable traffic light.

Additional information may be utilized in the analysis of whether a traffic light applies to the vehicle. A GPS device or other position solution can provide information relevant to the determination of whether a traffic light applies to the vehicle. For example, if a traffic light would otherwise meet the above-listed, three, thresholds, but additional sources provide that the vehicle is on a freeway with no crossroads, exit ramps or entrance ramps, the traffic light can be ruled out as applying to the vehicle based on this additional information, and thus, a false positive would be eliminated.

Parameter thresholds to "determine" whether a traffic light may apply to a vehicle are based on probabilities that the traffic light could apply. Accordingly, use of the term "determine" should be construed broadly to include determining that it is "likely" the traffic light is applicable. The algorithms can be constructed based on a chosen probability. In an exemplary embodiment of the invention, a probability of 95% or more is used to generate a decision that a traffic light applies.

Figure 3:
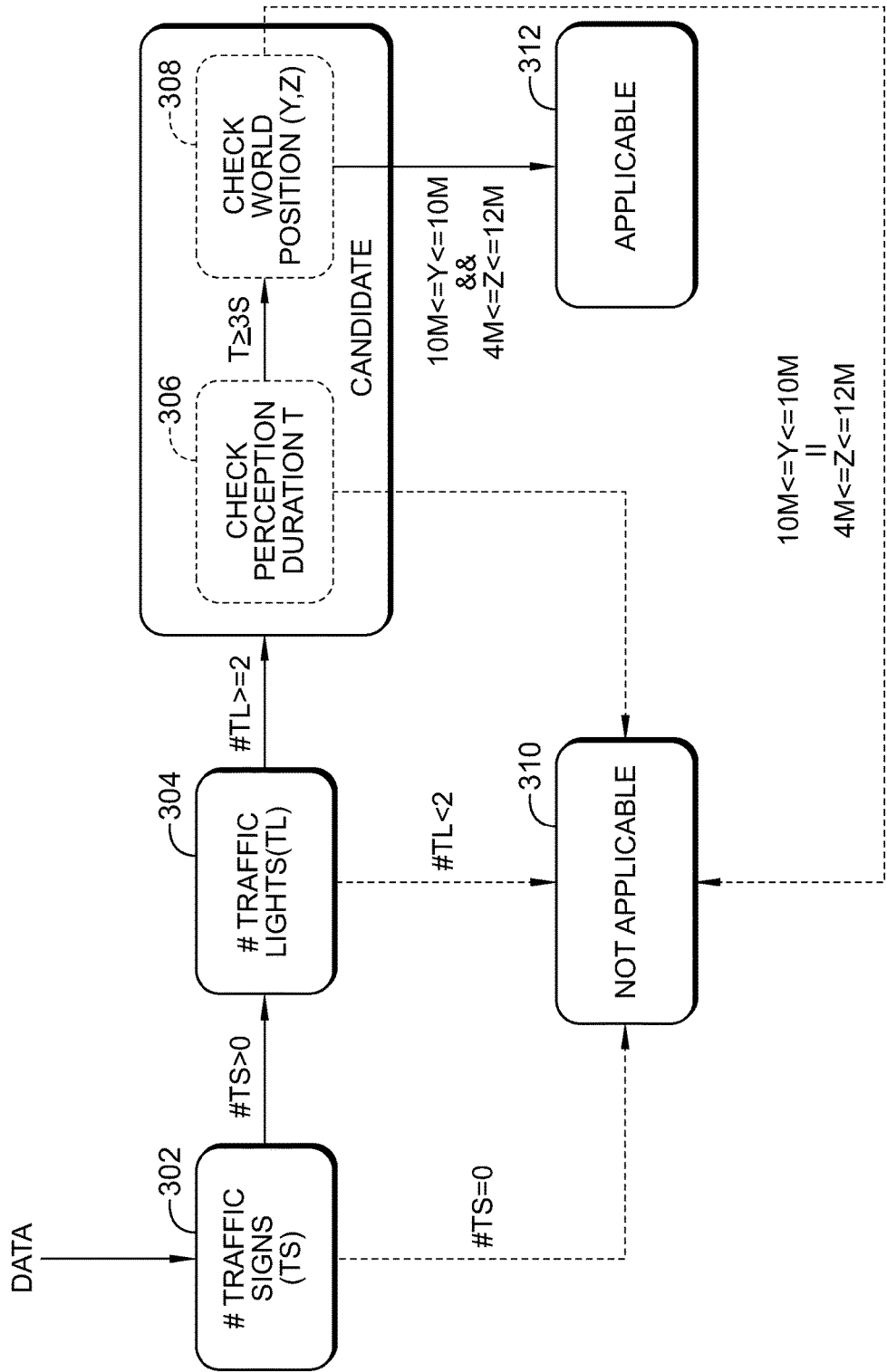
FIG. 3 provides an illustrative embodiment of the invention depicting exemplary threshold and range values used in the algorithms that determine whether the number of traffic lights, the duration of visibility and their spatial position indicate that a traffic light applies to a vehicle.

FIG. 3 provides an illustrative embodiment of the invention depicting exemplary threshold and range values. In step 302, traffic "signs" are detected by applying an object detecting algorithm to images obtained through an image capture device or other means that can provide information in a form compatible with the algorithm. Traffic "signs" may include lights, non-electronic signs such as stop signs, or other devices that must be observed by a vehicle. It is possible that the method can begin direct detection of a likely traffic light, rather than first capturing a wide range of traffic signs. In this illustrative example, all traffic signs are further evaluated to determine if they are traffic lights, which is indicated by a threshold of zero. If no traffic signs are detected no further analysis is needed as there is nothing applicable in the image related to observance of a traffic light so the process ends at block 310.

If traffic lights have been identified, they are next counted in step 304 to determine whether there are two or more in a particular frame. If not, the identified object is deemed "not applicable." If two or more objects are identified as possibly applicable traffic lights, further analysis is performed. Execution of the traffic light count algorithm is followed by evaluation of the duration that the identified objects are visible using a perception duration algorithm in step 306. Consecutive frames are evaluated for inclusion of identified objects that may be traffic lights. Based on the frame rate and the number of frames containing the traffic light, the duration is determined. If the duration is less than 3 seconds, then it is concluded that the traffic light does not apply to the vehicle, ending the steps in block 310. If the duration is greater than or equal to 3 seconds, then further analysis of the likely traffic light is performed.

In step 308 the position of the traffic light is determined. In this illustrative embodiment of the invention, if the traffic light is within a window defined by minimum and maximum distances in the lateral, Y direction and the vertical, Z direction, then the traffic light applies to the vehicle as provided in block 312. In this exemplary embodiment of the invention, the lateral window has a minimum distance of 10 meters and a maximum distance of 10 meters. The height window is greater than or equal to 4 meters and less than or equal to 12 meters. Both the height and lateral position thresholds must be met for a traffic light to apply to the vehicle in this embodiment. If any one of the spatial position values of the traffic light does not fall within the indicated window, then, as provided in block 310 the traffic light is determined to not apply to the vehicle.

Traffic light lateral position is generally referenced to a point on the vehicle designated as (0,0). Typically, (0,0) will be somewhere along the vehicle longitudinal centerline. Position (0,0) may be referenced to the TL info device, which will typically be positioned along the longitudinal centerline of the vehicle. The device may be installed on or incorporated into the vehicle, for example, in the vicinity of the windshield.

Figure 7:
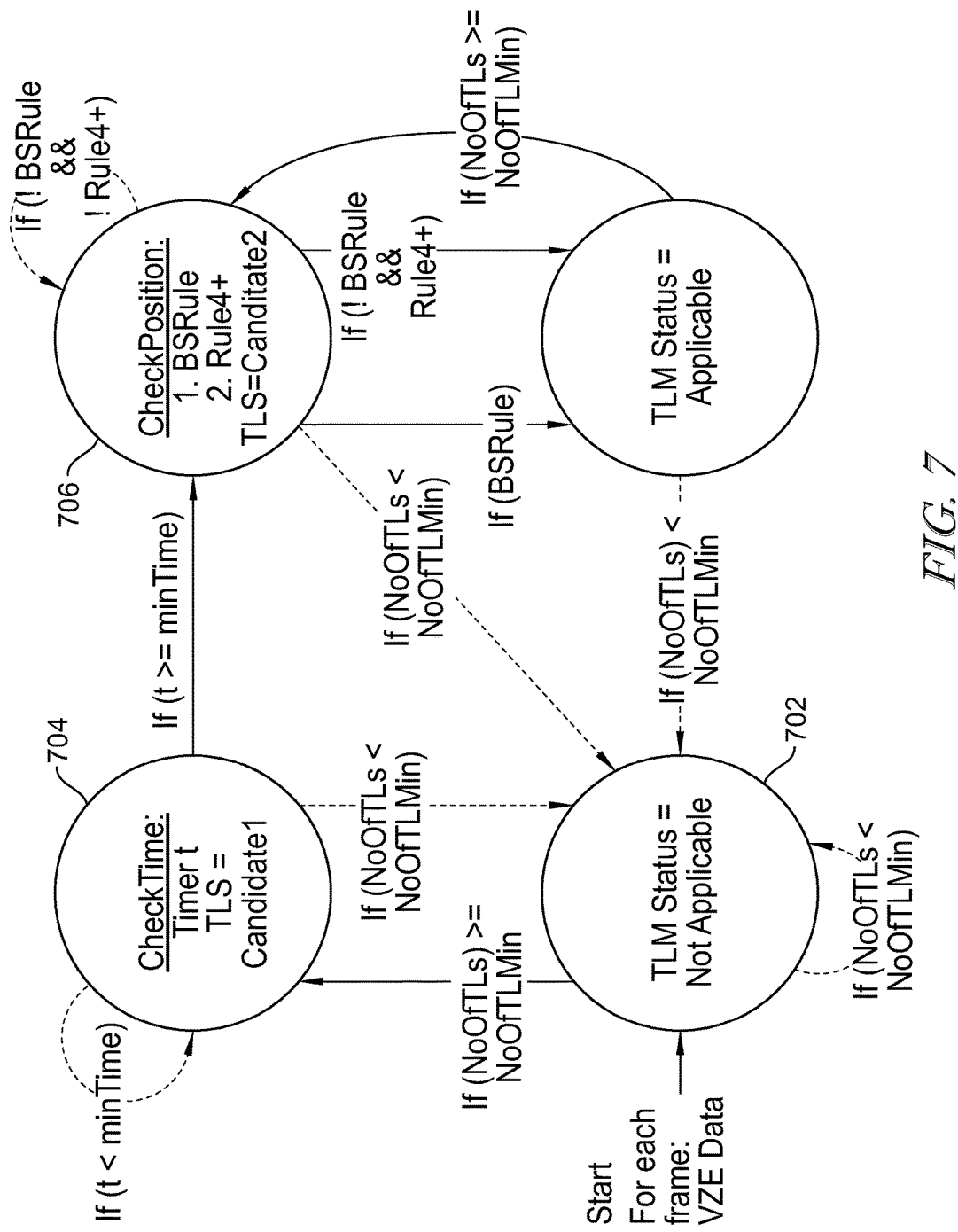
FIG. 7 is a diagram of a traffic light module according to an illustrative embodiment of the invention. It outlines spatial position rules applied to traffic lights, including determining how many traffic lights are on each side of the vehicle, and addressing situations where four or more traffic lights are visible in a single image frame.

FIG. 7, in addition to depicting the steps outlined in FIG. 3, namely evaluations of traffic light count in step 702 and evaluation of duration in step 704, provides an alternative spatial position analysis performed in step 706, according to an exemplary embodiment of the invention.

Step 706 includes establishing the distribution of traffic lights in relation to the vehicle. It also takes into account road configuration variations, such as the number of traffic lanes, by analyzing images differently that contain information associated with those road variations, such as larger counts of traffic lights in an image frame. These concepts are set out in more detail in FIG. 8.

Figure 8:
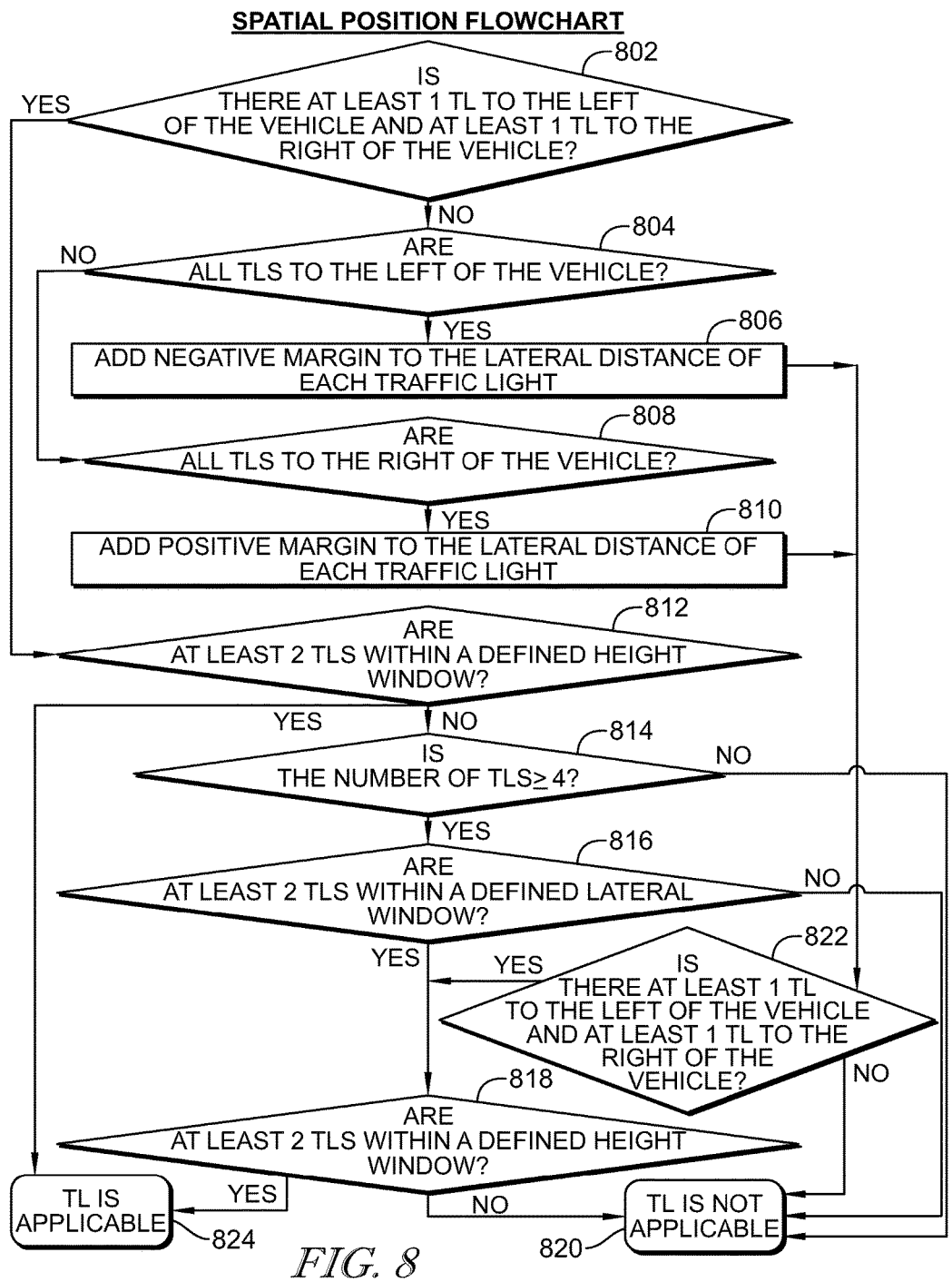
FIG. 8 is a flow chart that outlines the steps for the spatial position rules presented in FIG. 7, according to an illustrative embodiment of the invention.

Turning to FIG. 8 together with FIG. 7, two general rules are addressed according to exemplary embodiments of the invention. The "both sides" rule refers to the distribution of traffic lights to the left and right of the vehicle, and the 4+ rule is directed to situations where four or more traffic lights are present, for example in an image frame. Although the number four is used here, depending on the environment in which the vehicle will be operated, a different threshold number may be utilized to obtain an acceptable probability that a traffic light applies to the vehicle.

In step 802 it is determined whether the number of traffic lights to the left of the TL info device meets a threshold value, and separately whether the number of traffic lights to the right of the TL info device meets a threshold value. In this exemplary embodiment of the invention, the threshold value for each side is one. If the thresholds are met, then the height of the traffic lights is determined in step 812. If the traffic light height is within a designated range, it is concluded that the traffic light applies to the vehicle as shown in block 824. An illustrative traffic light height window, as measured vertically, for example from an image capture device located on a vehicle wind shield, if such were positioned in a vertical line below the traffic light, is greater than or equal to about 4 meters and less than or equal to about 12 meters. In the exemplary embodiment of the invention depicted in FIG. 8, at least two traffic lights must be in the defined height window in step 812.

If the distribution of traffic lights with respect to position (0,0) is determined in step 802 not to meet the threshold values, whether they are all either to the left or all to the right of (0,0), respectively, is established in steps 804 and 808. The determinations referenced in the preceding sentence can be made in either order. If all traffic lights are to the left of (0,0), then in step 806, a negative margin is added to the lateral distance of each traffic light from (0,0). If all traffic lights are to the right of (0,0), then in step 810, a positive margin is added to the lateral distance of each traffic light from (0,0). With the negative or positive margins added, it is again evaluated, this time in step 822, whether there is at least one traffic light to the left of (0,0) and one traffic light to the right of (0,0). If the required distribution of traffic lights to the left and right of (0,0) is not satisfied, it is determined that the traffic lights do not apply to the vehicle as shown by block 820. If the distribution requirement is fulfilled, then the height of the traffic lights is analyzed in step 818. In this exemplary embodiment of the invention, at least two traffic lights must be in the defined height window. If the step 818 condition is met, then the traffic light applies to the vehicle as shown by block 824. If the condition is not met, then the traffic light does not apply, as shown by block 820.

Returning to step 812, if at least two traffic lights are not in the defined height window, the number of traffic lights is again assessed in step 814, this time to determine whether the count is above a threshold that relates to a specially-treated condition. In this exemplary embodiment of the invention, the special case is when there are four or more traffic lights detected. If there are less than four traffic lights, it is concluded that the traffic lights do not apply to the vehicle as shown in block 820. If there are four or more traffic lights counted in step 814, then the lateral distance of the traffic lights from position (0,0) is evaluated in step 816. If less than two traffic lights are within a defined lateral window, then the traffic lights do not apply to the vehicle. If at least two traffic lights are in the defined lateral window, then further spatial analysis is performed in step 818. In an exemplary embodiment of the invention, the lateral window is ±10 meters from the vehicle. In other words, the two identified traffic lights are laterally positioned within 10 meters to the left of (0,0) and 10 meters to the right of (0,0).

In step 818 the heights of the traffic lights are analyzed. In this particular embodiment of the invention, if at least two traffic lights are in a defined height window, then the traffic lights are deemed applicable to the vehicle as shown by block 824, and, if this rule is not satisfied, the traffic lights are deemed inapplicable as provided by block 820.

In an illustrative embodiment of the invention, the height analysis and the determination of the distribution of traffic lights to the right and left of position (0,0) are performed before the lateral distance analysis.

Calculations or determinations of traffic light position and height may be established by the image capture device or other TL info device or combination of devices, and their related software, or other programs may be interfaced with the system. Spatial positions may be direct determinations or may be calculated, for example based on the known distance from the traffic light and the angle to the device or other variables.

After the evaluations of traffic light count, visibility duration and spatial position, the resulting output is the classification of whether the detected traffic light is "applicable" or "not applicable" to the vehicle.

Computer code according to an illustrative embodiment of the invention includes, at least in part, the following traffic light detection and classification algorithm as simplified using pseudocode:

```
Input : T (a subset of traffic light detected in a frame)
Output : TL_Status := {Not_Applicable,Applicable} // TL = Traffic Light
"Both Sides Rule" designated as BS.
Initialization : TL_Status = Not_Applicable;
{
    for each frame do
        check number of Traffic lights detected or the size of T
        if (size(T) < TL_threshold)
            // Not enough detected TLs
            TL_Status = Not_Applicable;
        else
            // Wait and observe for some seconds
            t = checkPerceptionDuration( );
            if (t < Time_threshold)
                TL_Status = Not Applicable;
            else
                // Apply the BS rule with vehicle position at y = 0
                BS_Condition = check_BS_Rule(y = 0);
                if(BS_Condition = true)
                    TL_Status = Applicable;
                else
                    // Apply the BS rule by shifting the vehicle position at
y = lateralMarginLeft
                    BS_Alternative_1 = check_BS_Rule(y =
lateralMarginLeft);
                    if(BS_Alternative_1 = true)
                        TL_Status = Applicable;
                    else
                        // Apply the BS rule by shifting the vehicle
lateral position at y = lateralMarginRight
                        BS_Alternative_2 = check_BS_Rule(y =
lateralMarginRight);
                        if(BS_Alternative_2 = true)
                            TL_Status = Applicable;
                        else
                            // Apply the 4+ Rule
                            4Rule_Condition = check_4_Rule( );
                            if(4Rule_Condition = true)
                                TL_Status = Applicable;
                            else
                                TL_Status = Not_Applicable;
                        endIf
                    endIf
```

```
                        endIf
                    endIf
                endIf
            endIf
        endFor
}
/************************************************
//Function Function checkPerceptionDuration
************************************************/
Time Initialization
t = 0;
time = checkPerceptionDuration ( )
for each frame
    if (size(T) > TL_threshold)
        t = t + 1;
    endIf
    time = t;
endFor
/************************************************
//Function condition = check_BS_Rule( yMargin )
************************************************/
condition = check_BS_Rule( yMargin )
{
//Initialization :
condition                       = false;
//Counter for how many TL are in the left of the margin (vehicle position)
TL_Counter_lateral_left         = 0;
//Counter for how many TL are in the right of the margin (vehicle position)
TL_Counter_lateral_right        = 0;
//Counter for how many TL are within the height window
TL_Counter_Height               = 0;
//T is the TL candiadte list that has passed the count and time conditions
if(size(T)>=2)
    do
        for each frame
            for each traffic light
                // check the lateral position
                y = lateral distance of the processed traffic light;
                // There are 2 options:
                if (y >= yMargin)
                    //TL is on the left of the vehicle
                    TL_Counter_lateral_left++;
                else
                    //TL is on the right of the vehicle
                    TL_Counter_lateral_right++;
                endIf
                // check the lateral position
                z = height position of the processed traffic light;
                // height_max & height_min are params
                if ( z <= height_max && z >= height_min)
                    TL_Counter_Height++;
                end
            endFor
            // final Check
            if(TL_Counter_lateral_left>= 1 && TL_Counter_lateral_right>= 1 && TL_Counter_Height>= 2)
                condition = true;
        end
    endFor
}
/************************************************
//Function condition = check_4_Rule( )
************************************************/
condition = check_4_Rule( )
{
//Initialization :
condition          = false;
//Counter for how many TL are within the lateral window
TL_Counter_lateral       = 0;
//Counter for how many TL are within the height window
TL_Counter_Height        = 0;
//T is the TL candidate list that has passed the count and time conditions
if(size(T)>=4)
    do
        for each frame
            for each traffic light
                // check the lateral position
                y = lateral distance of the processed traffic light;
                if (y <= yMargin_left && y > yMargin_right )
```

```
                TL_Counter_lateral++;
            endIf
            // check the lateral position
            z = height position of the processed traffic light;
              if ( z <= height_max && z >= height_min)
                TL_Counter_Height++;
            end
        endFor
        // final Check
        if(TL_Counter_lateral>= 2 && LCounter_Height>= 2)
                condition = true;
        end
    endFor
endIf
    }
```

Figure 4:
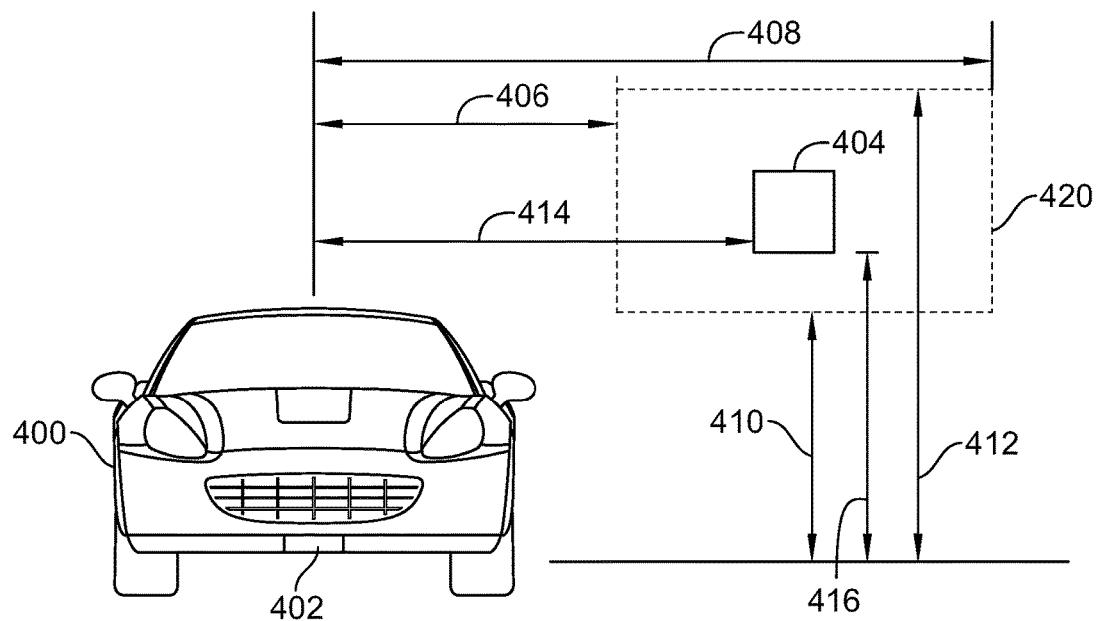
FIG. 4 depicts a front view of a vehicle and provides a representation of the spatial position frame within which a traffic light resides to apply to the vehicle, according to an illustrative embodiment of the invention. The spatial position frame is based on the threshold values for lateral distance between the vehicle and traffic light and the height of the traffic light.
Figure 5:
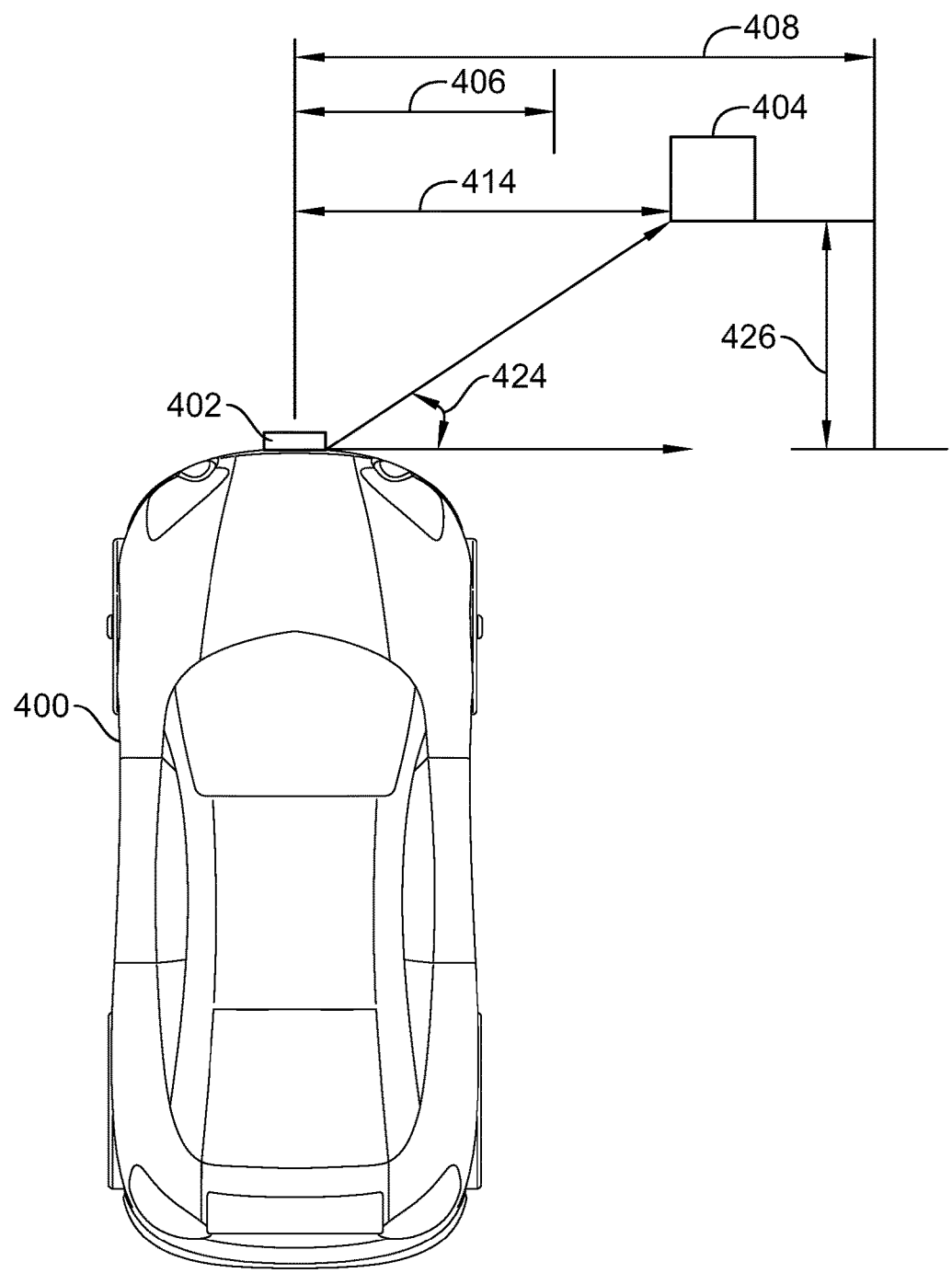
FIG. 5 depicts a top view of a vehicle and shows lateral distance measurements between a vehicle and traffic light according to an illustrative embodiment of the invention.
Figure 6:
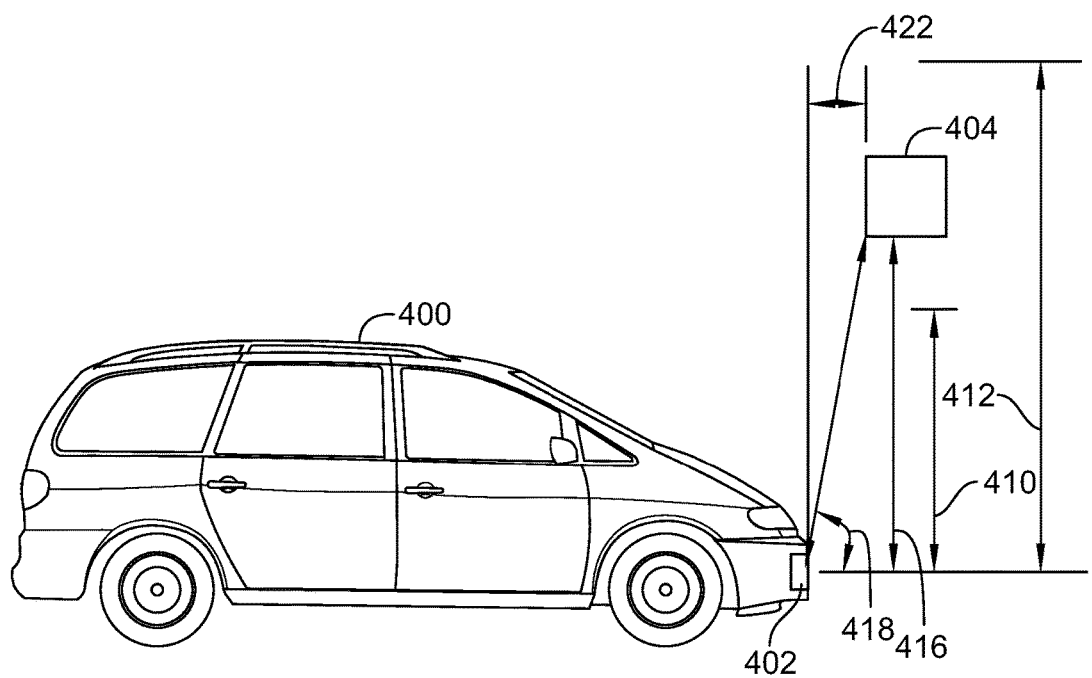
FIG. 6 depicts a side view of a vehicle and illustrates traffic light height measurements according to an illustrative embodiment of the invention.

FIGS. 4-6 depict measurements taken and analyzed by the system according to an illustrative embodiment of the invention. A front view of vehicle 400 is shown in FIG. 4. Vehicle 400 is depicted from the top in FIG. 5 and from the side in FIG. 6. Changes in the position of the traffic light are considered over time. Typically, the traffic lights become visible to the camera or other sensor only when the car is about 200 meters in front of it. From that location, the position of the traffic light is tracked and continues until the traffic light is visible in the threshold frame. Then, the algorithm containing the "position window" rule is applied for each frame.

Turning to FIGS. 4 and 5, vehicle 400 has an image capture device 402 fixed at a position that enables it to capture images of potentially applicable traffic lights. Although shown here on a car bumper for illustrative purposes, an alternative location such an on a windshield will likely be appropriate. Other information-receiving devices could be used in place of, or in conjunction with, the image capture device. Vehicle 400 may have additional image capture devices, the information from which is either utilized alone or in combination with information from other image capture devices.

Box 420, shown in broken lines in FIG. 4, represents the spatial position window within which a traffic light must be to apply to the vehicle based on the threshold values that are incorporated into the relevant algorithms of lateral distance between the vehicle and traffic light and the height of the traffic light from the level of the image capture device.

Traffic light 404 is shown positioned within window 420. Traffic light 404 is at a lateral distance 414 from image capture device 402. Lateral distance 414 is within a minimum threshold lateral distance 406 and a maximum threshold lateral distance 408. Traffic light 404 is at a height 416, which is within a minimum threshold height 410 and a maximum threshold height 412.

FIG. 6 illustrates measurements that may be considered when evaluating the height of a traffic light. Because traffic light 404 must be considered prior to vehicle 400 reaching the light, traffic light height 416 may not be a direct, height measurement. Calculation of height may require additional measurements such as the distance 422 that traffic light 404 is in front of vehicle 400 and the angle 418 from image capture device 402 to traffic light 404, as measured from the horizontal, to determine the traffic light height 416. These determinations or calculations may be made by software associated with the TL info device or algorithms incorporated into the control system.

Similarly, lateral distance 414 may not be a direct measurement and may require other measurements to be considered. For example, angle 424 and forward distance 426 shown in FIG. 5 may be used to determine the lateral distance between the vehicle and the traffic light.

As one skilled in the art will understand, various geometry calculations may be necessary to obtain the spatial position measurements that will be compared to the threshold values. Instructions saved in memory devices 108 and executed by processors 106 may provide the necessary calculations based on TL info devices 104.

The selected threshold and range values described in the exemplary embodiment above are provided as a particular example. In further illustrative embodiments of the invention the threshold values to use in each algorithm may be selected from the following ranges:

Number of traffic lights: 2 per frame to 20 per frame;
Duration: about zero sec to about 5 sec;
Number of traffic lights to the left of the vehicle:
    at least one to at least three;
Number of traffic lights to the right of the vehicle:
    at least one to at least three;
Height of traffic light:
    minimum: about 3 meters to about 5 meters
    maximum: about 10 meters to about 14 meters;

For a special environmental situation, such as in the event there are four or more traffic lights visible in a frame, a lateral window can be defined with values selected from the following ranges:

to the left of position (0,0): about 8 to about 12 meters;
to the right of position (0,0): about 8 to about 12 meters.

In an exemplary embodiment of the invention, the threshold quantities take into account regulations in various jurisdictions, such as minimum lane widths and traffic light position requirements, so the control system will be effective regardless of the vehicle location.

An illustrative vehicle speed to which the invention may apply is about 40 mph. Thresholds, such as for the duration of traffic light image capture, may be modified based on faster or slower vehicle speed.

Image capture devices used will typically have a frame rate of about 25-60 frames per second. Various adjustments can be made to the algorithms if necessary to take into account different frame rates.

Illustrative embodiments of the invention have been described primarily with regard to use of image capture devices. It is noted that other TL info devices may be substituted, provided that count, duration and spatial position can be gleaned from the information obtained and transmitted by the devices. The TL info devices may include receivers of information transmitted by other devices or may directly obtain information such as image capture devices.

Embodiments of the invention are particularly applicable to traditional traffic light sets containing at least a red, yellow and green light. Other types of lights can be eliminated from consideration prior to applying the count, duration and spatial position algorithms. Analogous algorithms can also be created to apply to other types of traffic lights and signs.

Various embodiments of the invention have been described, each having a different combination of elements. The invention is not limited to the specific embodiments disclosed, and may include different combinations of the elements disclosed or omission of some elements and the equivalents of such structures.

While the invention has been described by illustrative embodiments, additional advantages and modifications will occur to those skilled in the art. Therefore, the invention in its broader aspects is not limited to specific details shown and described herein. Modifications, for example, to specific steps in algorithms to reach the same goal, incorporation of equivalent components in the systems, and variations in threshold values based on the vehicle environment and type of vehicle may be made without departing from the invention. Accordingly, it is intended that the invention not be limited to the specific illustrative embodiments, but be interpreted within the full spirit and scope of the appended claims and their equivalents.

The invention claimed is:

1. A system for identifying traffic lights that apply to a vehicle comprising:
   one or more image capture devices configured to capture a plurality of images representative of an area surrounding the vehicle;
   one or more data interfaces;
   one or more processors configured to receive the plurality of images from the one or more image capture devices via the one or more data interfaces;
   one or more non-transitory storage devices on which is stored executable computer code operatively coupled to the one or more processors;
   the executable computer code containing;
   a count algorithm to compare the number of traffic lights detected in each frame to a first threshold count;
   a duration algorithm to compare the duration each traffic light detected is visible to a threshold duration; and
   a position algorithm to compare the position of each traffic light detected to a threshold position;
   wherein comparing the position of each traffic light to a threshold position includes:
   identifying a reference point (0,0) on the vehicle;
   determining whether there is at least a threshold number of traffic lights to the left of (0,0) and a threshold number of traffic lights to the right of (0,0);
   if the threshold number of traffic lights to both the left and right of (0,0) is met then determining if at least a threshold number of traffic lights is within a defined height window; and
   if the threshold count, threshold duration and threshold position are met, then classifying the traffic lights as applicable to the vehicle.

2. The system of claim 1 wherein the order of comparing the established parameter values to the threshold values is:
   count first;
   duration second; and
   position third.

3. The system of claim 1 wherein the threshold number of traffic lights to the left of (0,0) and to the right of (0,0) is each one.

4. The system of claim 1 wherein the threshold number of traffic lights within the height window is two.

5. The system of claim 1 wherein the processors are configured to, if the threshold number of traffic lights on each of the left and right sides of (0,0) is not met:
   determine whether all traffic lights are on the right side of (0,0) or all traffic lights are on the left side of (0,0);
   add a negative margin to the lateral distance from (0,0) to each traffic light if all traffic lights are on the left side of (0,0);
   add a positive margin to the lateral distance from (0,0) to each traffic light if all traffic lights are on the right side of (0,0);
   after adding the positive or negative margin to the lateral distance, determine whether there is a threshold number of traffic lights to the left of (0,0) and a threshold number of traffic lights to the right of (0,0);
   if the threshold number of traffic lights to both the left and right of (0,0) is met, then determine if at least a threshold number of traffic lights are within a defined height window; and
   if the threshold number of traffic lights is within the height window, classify the traffic lights in the height window as applicable to the vehicle.

6. The system of claim 1 wherein the processors are configured to, if the threshold number of traffic lights is not within the height window:
   determine if the number of traffic lights in the image frame meets a second threshold count of traffic lights;
   if the number of traffic lights meets the second threshold count, determine whether at least a threshold number of traffic lights are within a defined lateral window;
   if the threshold number of traffic lights is within the lateral window, then determine whether at least a threshold number of traffic lights is within the defined height window; and
   if the threshold number of traffic lights is within the defined height window, classify the traffic lights in the height window as applicable to the vehicle.

7. The system of claim 6 wherein the second threshold count of traffic lights in the image frame is four.

8. The system of claim 6 wherein the lateral distance window is defined by a distance to the right of (0,0) of about 10 meters and a distance to the left of (0,0) of about 10 meters.

9. The system of claim 1 wherein the first threshold count of traffic lights in the image frame is one.

10. The system of claim 1 wherein the threshold duration is greater than or equal to about three seconds.

11. The system of claim 1 wherein the threshold maximum traffic light height is about 12 meters and the threshold minimum traffic light height is about 4 meters.

12. A vehicle comprising a system according to claim 1.

13. A method for identifying traffic lights that apply to a vehicle comprising:
   receiving, via one or more processing devices, a plurality of image frames from one or more image capture devices, the images representative of an area surrounding the vehicle, the images including one or more traffic lights;
   executing one or more of the following steps:
   counting the number of traffic lights in each image frame and comparing it to a first threshold count using a count algorithm executed by a processing device;
   measuring the time the traffic lights are visible to the vehicle's image capture device and comparing it to a threshold duration using a duration-determining algorithm executed by a processing device; and determining the spatial position of the traffic lights relative to the vehicle and comparing it to threshold position parameters using a position algorithm executed by a processing device;

wherein determining the spatial position of the traffic lights relative to the vehicle includes:

identifying a reference point (0,0) on the vehicle:

determining whether there is at least a threshold number of traffic lights to the left of (0,0) and a threshold number of traffic lights to the right of (0,0);

if the threshold number of traffic lights to both the left and right of (0,0) is met, then determining if at least a threshold number of traffic lights is within a defined height window; and if the threshold count, threshold duration and threshold position are met, classifying the traffic lights as applicable to the vehicle;

wherein the order of executing the algorithms is:

count algorithm first;
duration algorithm second; and
position algorithm third.

14. The method of claim 13 wherein the first threshold count of traffic lights to the left of (0,0) and to the right of (0,0) is each one.

15. The method of claim 13 wherein the threshold number of traffic lights within the height window is two.

16. The method of claim 13 further comprising the steps of:

if the threshold number of traffic lights on each of the left and right sides of (0,0) is not met, determining whether all traffic lights are on the right side of (0,0) or all traffic lights are on the left side of (0,0);

if all traffic lights are on the left side of (0,0) then adding a negative margin to the lateral distance from (0,0) to each traffic light;

if all traffic lights are on the right side of (0,0) then adding a positive margin to the lateral distance from (0,0) to each traffic light;

after adding the positive or negative margin to the lateral distance, determining whether there is a threshold number of traffic lights to the left of (0,0) and a threshold number of traffic lights to the right of (0,0);

if the threshold number of traffic lights to both the left and right of (0,0) is met, then determining if at least a threshold number of traffic lights are within a defined height window; and if the threshold number of traffic lights is within the height window, classifying the traffic lights in the height window as applicable to the vehicle.

17. The method of claim 16 wherein the lateral distance window is defined by a distance to the right of (0,0) of about 10 meters and a distance to the left of (0,0) of about 10 meters.

18. The method of claim 13 further comprising the steps of:

if the threshold number of traffic lights is not within the height window, determining if the number of traffic lights in the image frame meets a second threshold count of traffic lights;

if the number of traffic lights meets the second threshold count, determining whether at least a threshold number of traffic lights are within a defined lateral window;

if the threshold number of traffic lights is within the lateral window, then determining whether at least a threshold number of traffic lights is within the defined height window; and if the threshold number of traffic lights is within the defined height window, classifying the traffic lights in the height window as applicable to the vehicle.

19. The method of claim 18 wherein the second threshold count of traffic lights in the image frame is four.

20. The method of claim 13 wherein the threshold number of traffic lights in an image frame is greater than or equal to a number in the range of 2 to 20.

21. The method of claim 20 wherein the threshold number of traffic lights in an image frame is greater than or equal to 2.

22. The method of claim 13 wherein the threshold duration is greater than or equal to a duration in a range of about 0 seconds to about 5 seconds.

23. The method of claim 22 wherein the threshold duration is greater than or equal to about three seconds.

24. The method of claim 13 wherein the threshold maximum traffic light height is about 12 meters and the threshold minimum traffic light height is about 4 meters.

25. A non-transitory computer-readable storage medium on which is stored computer code, which when executed on one or more processors causes a computer system to perform the traffic light detection method of:

receiving, via one or more processing devices, a plurality of image frames from one or more image capture devices, the images representative of an area surrounding the vehicle, the images including one or more traffic lights;

executing one or more of the following steps:

counting the number of traffic lights in each image frame and comparing it to a first threshold count using a count algorithm executed by a processing device;

measuring the time the traffic lights are visible to the vehicle's image capture device and comparing it to a threshold duration using a duration algorithm executed by a processing device; and determining the spatial position of the traffic lights relative to the vehicle and comparing it to threshold position parameters using a position algorithm executed by a processing device;

wherein determining the spatial position of the traffic lights relative to the vehicle includes:

identifying a reference point (0,0) on the vehicle:

determining whether there is at least a threshold number of traffic lights to the left of (0,0) and a threshold number of traffic lights to the right of (0,0);

if the threshold number of traffic lights to both the left and right of (0,0) is met, then determining if at least a threshold number of traffic lights is within a defined height window; and if the threshold count, threshold duration and threshold position are met, classifying the traffic lights as applicable to the vehicle;

wherein the order of executing the algorithms is:

count algorithm first;
duration algorithm second; and
position algorithm third.

26. The non-transitory computer-readable storage medium of claim 25 wherein the threshold number of traffic lights to the left of (0,0) and to the right of (0,0) is each one.

27. The non-transitory computer-readable storage medium of claim 25 wherein the threshold number of traffic lights within the height window is two.

28. The non-transitory computer-readable storage medium of claim 25 further comprising the steps of:
   if the threshold number of traffic lights on each of the left and right sides of (0,0) is not met, determining whether all traffic lights are on the right side of (0,0) or all traffic lights are on the left side of (0,0);
   if all traffic lights are on the left side of (0,0) then adding a negative margin to the lateral distance from (0,0) to each traffic light;
   if all traffic lights are on the right side of (0,0) then adding a positive margin to the lateral distance from (0,0) to each traffic light;
   after adding the positive or negative margin to the lateral distance, determining whether there is a threshold number of traffic lights to the left of (0,0) and a threshold number of traffic lights to the right of (0,0);
   if the threshold number of traffic lights to both the left and right of (0,0) is met, then determining if at least a threshold number of traffic lights are within a defined height window; and
   if the threshold number of traffic lights is within the height window, classifying the traffic lights in the height window as applicable to the vehicle.

29. The non-transitory computer-readable storage medium of claim 28 wherein the lateral distance window is defined by a distance to the right of (0,0) of about 10 meters and a distance to the left of (0,0) of about 10 meters.

30. The non-transitory computer-readable storage medium of claim 25 further comprising the steps of:
   if the threshold number of traffic lights is not within the height window, determining if the number of traffic lights in the image frame meets a second threshold count of traffic lights;
   if the number of traffic lights meets the second threshold count, determining whether at least a threshold number of traffic lights are within a defined lateral window;
   if the threshold number of traffic lights is within the lateral window, then determining whether at least a threshold number of traffic lights is within the defined height window; and
   if the threshold number of traffic lights is within the defined height window, classifying the traffic lights in the height window as applicable to the vehicle.

31. The non-transitory computer-readable storage medium of claim 30 wherein the second threshold number of traffic lights in the image frame is four.

32. The non-transitory computer-readable storage medium of claim 25 wherein the threshold duration is greater than or equal to about three seconds.

33. The non-transitory computer-readable storage medium of claim 25 wherein the threshold maximum traffic light height is about 12 meters and the threshold minimum traffic light height is about 4 meters.

* * * * *